(12) United States Patent
Baur et al.

(10) Patent No.: US 6,251,553 B1
(45) Date of Patent: Jun. 26, 2001

(54) USE OF MIXED-CRYSTAL PIGMENTS OF THE QUINACRIDONE SERIES IN ELECTROPHOTOGRAPHIC TONERS AND DEVELOPERS, POWDER COATINGS AND INKJET INKS

(75) Inventors: Ruediger Baur, Eppstein; Manfred Urban, Wiesbaden; Hans-Tobias Macholdt, Darmstadt; Dieter Schnaitmann, Eppstein; Martin Boehmer, Neu-Anspach, all of (DE)

(73) Assignee: Clariant GmbH, Frankfurt (DE)

( * ) Notice: Subject to any disclaimer, the term of this patent is extended or adjusted under 35 U.S.C. 154(b) by 0 days.

(21) Appl. No.: 09/447,519

(22) Filed: Nov. 23, 1999

(30) Foreign Application Priority Data

Nov. 26, 1998 (DE) .............................. 198 54 571

(51) Int. Cl.[7] ..................................... G03G 9/08
(52) U.S. Cl. .......................................... 430/106; 430/109
(58) Field of Search ..................... 430/106, 109

(56) References Cited

U.S. PATENT DOCUMENTS

| 4,777,105 | 10/1988 | Macholdt et al. . |
|---|---|---|
| 5,591,258 | 1/1997 | Urban et al. . |
| 5,755,872 | 5/1998 | Urban et al. . |
| 5,989,333 | 11/1999 | Urban et al. . |

FOREIGN PATENT DOCUMENTS

| 0247576 | 12/1987 | (EP) . |
|---|---|---|
| 0 655 485 | 5/1995 | (EP) . |
| 0 799 862 | 10/1997 | (EP) . |
| 0822460 | 2/1998 | (EP) . |
| 0827039 | 3/1998 | (EP) . |
| 0 896 034 | 2/1999 | (EP) . |

OTHER PUBLICATIONS

EPO Search Report.
Derwent Publication Ltd. XP–002130965.

*Primary Examiner*—John Goodrow
(74) *Attorney, Agent, or Firm*—Susan S. Jackson; Scott E. Hanf

(57) ABSTRACT

The use of mixed-crystal pigments of the quinacridone series consisting of a) from 85 to 99% by weight of unsubstituted β-phase quinacridone of the formula (I)

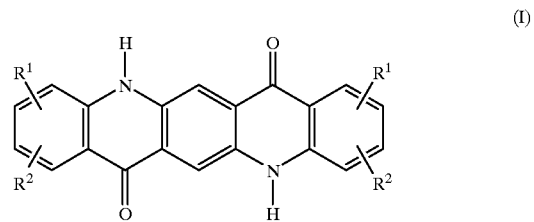

(I)

in which $R^1$ and $R^2$ are hydrogen atoms, and b) from 1 to 15% by weight of one or more substituted quinacridones of the formula (I) in which the substituents $R^1$ and $R^2$ are identical or different and are chlorine, bromine or fluorine atoms or $C_1$–$C_4$-alkyl, $C_1$–$C_4$-alkoxy or carboxamido groups, which can be substituted by $C_1$–$C_6$-alkyl groups, and $R^1$ can additionally be hydrogen, as colorants in electrophotographic toners and developers, powder coating materials, inkjet inks, electret fibers, and color filters.

12 Claims, No Drawings

USE OF MIXED-CRYSTAL PIGMENTS OF THE QUINACRIDONE SERIES IN ELECTROPHOTOGRAPHIC TONERS AND DEVELOPERS, POWDER COATINGS AND INKJET INKS

The present invention relates to the use of novel mixed-crystal pigments in electrophotographic toners and developers, powder coating materials and inkjet inks.

DESCRIPTION OF THE RELATED ART

In electrophotographic recording techniques a "latent charge image" is produced on a photoconductor. This latent charge image is developed by applying an electrostatically charged toner which is then transferred, for example, to paper, textiles, foils or plastic and is fixed by means, for example, of pressure, radiation, heat, or the action of a solvent. Typical toners are one- or two-component powder toners (also called one- or two-component developers); furthermore, special toners are employed, examples being magnetic or liquid toners, latex toners and polymerization toners.

One measure of the quality of a toner is its specific charge q/m (charge per unit mass). In addition to the sign and level of the electrostatic charge, the rapid attainment of the desired charge level and the constancy of this charge over a prolonged activation period, in particular, is a decisive quality criterion. Moreover, the insensitivity of the toner to climatic effects such as temperature and atmospheric humidity is another important criterion for its suitability.

Both positively and negatively chargeable toners are used in photocopiers, laser printers, LEDs (light-emitting diodes), LCS (liquid crystal shutter) printers or other digital printers based on electrophotography, depending on the type of process and type of equipment.

In order to obtain electrophotographic toners or developers with either a positive or a negative charge it is common to add charge control agents. As the color-imparting component in color toners, use is typically made of organic color pigments. As compared with dyes, color pigments have considerable advantages on account of their insolubility in the application medium, such as improved thermal stability and lighffastness, for example.

On the basis of the principle of substractive color mixing it is possible, with the aid of the three primary colors yellow, cyan and magenta, to reproduce the entire spectrum of colors visible to the human eye. Exact color reproduction is only possible if the particular primary color satisfies the precisely defined color requirements. If this is not the case, some shades cannot be reproduced and the color contrast is inadequate.

In the case of full color toners, the three toners yellow, cyan and magenta must not only meet the precisely defined color requirements but must also be matched exactly to one another in their triboelectric properties, since they are transferred one after another in the same device.

It is known that colorants may have a long-term effect in some cases on the triboelectric charging of toners. Because of the different triboelectric effects of colorants and, as a result, their sometimes highly pronounced effect on toner chargeability, it is not possible simply to add the colorants to a toner base formulation once prepared. It may instead be necessary to prepare a specific formulation for each colorant, with the nature and amount of the required charge control agent being tailored specifically. This approach is, correspondingly, laborious and in the case of color toners for process color is just another difficulty to add to those already described above.

Furthermore, it is important for practical use that the colorants possess high thermal stability and good dispersibility. Typical temperatures for incorporation of colorants into the toner resins are between 100° C. and 200° C. when using compounders or extruders. Accordingly, a thermal stability of 200° C., or even better 250° C., is a great advantage. It is also important that the thermal stability is maintained over a prolonged period (about 30 minutes) and in different binder systems. Typical toner binders are resins formed by addition polymerization, polyaddition and polycondensation, such as styrene, styrene-acrylate, styrene-butadiene, acrylate, polyester and phenol-epoxy resins, polysulfones and polyurethanes, individually or in combination.

Fundamentally there is a need for color pigments possessing a very high degree of transparency, good dispersibility and a low inherent electrostatic effect: as far as possible a neutral inherent triboelectric effect. Neutral inherent triboelectric effect means that the pigment has very little or no effect on the inherent electrostatic charging of the resin and readily follows a defined charge established by means, for example, of charge control agents.

Transparency is of essential importance since, in the case of full color copies or in printing, the colors yellow, cyan and magenta are copied or printed over one another, the sequence of colors depending on the device. Consequently, if an overlying color is not sufficiently transparent, then the underlying color is unable to show through to a sufficient extent and the color reproduction is distorted. In the case of copying or printing on sheets for overhead projection use, transparency is even more important, since in this case a lack of transparency even in just one color makes the whole of the projected image gray.

The object of the present invention is to provide color pigments satisfying the above requirements for use in electrophotographic toners and developers, powder coating materials, inkjet inks, color filters, and electret fibers.

This object has surprisingly been achieved by the use of quinacridone mixed crystals defined hereinbelow.

SUMMARY OF THE INVENTION

The present invention provides for the use of mixed-crystal pigments of the quinacridone series, consisting of a) from 85 to 99% by weight, in particular from 87 to 95% by weight, of unsubstituted β-phase quinacridone of the formula (I)

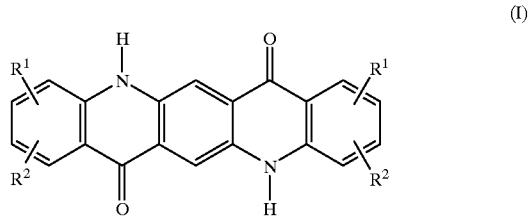

in which $R^1$ and $R^2$ are hydrogen atoms, and b) from 1 to 15% by weight, in particular from 5 to 13% by weight of one or more substituted quinacridones of the formula (I) in which the substituents $R^1$ and $R^2$ are identical or different and are chlorine, bromine or fluorine atoms or $C_1$–$C_4$-alkyl, $C_1$–$C_4$-alkoxy or carboxamido groups, which can be substituted by $C_1$–$C_6$-alkyl groups, and $R^1$ can additionally be hydrogen, as colorants in electrophotographic toners and developers, powder coating materials, inkjet inks, electret fibers, and color filters.

DESCRIPTION OF THE PREFERRED EMBODIMENTS

Quinacridone mixtures comprising from 85 to 99% by weight of unsubstituted β-phase quinacridone and from 1 to 15% by weight of one or more, especially 1 or 2, differently substituted quinacridones under certain conditions form mixed crystals, also referred to as solid solutions. By mixed crystals are meant systems in which one or more components added—usually in a nonstoichiometric ratio—to a crystal phase crystallize together with the host compound in one and the same lattice. The X-ray diffraction diagram of a mixed crystal shows only the reflections of the (in many cases expanded) crystal lattice of the host compound or else of a similar or else of a markedly different crystal lattice, whereas the reflections of all the components appear in the X-ray diffraction diagram of the corresponding mechanical mixture.

In the mixed-crystal pigments used in accordance with the invention, preference is given to substituted quinacridones (b) of the formula (I) in which $R^1$ is hydrogen, chlorine atoms, methyl groups or carboxamido groups and $R^2$ is chlorine atoms, methyl or carboxamido groups.

The color properties of the mixed-crystal pigments of the invention differ considerably from those of the corresponding mechanical mixtures of the individual components. In particular, they possess cleaner hues and have higher color strengths. Furthermore, the hues obtained cannot be established using the individual components or the prior art mixed crystals, especially in the red-violet region. The fastness properties are excellent.

The mixed-crystal pigments described above can be prepared by cyclizing the 2,5-dianilinoterephthalic acid on which the compound a) is based and the substituted terephthalic acid(s) on which the compound b) is based in a ratio of from 85:15 to 99:1, in particular from 87:13 to 95:5, in the presence of polyphosphoric acid and/or polyphosphoric esters, hydrolyzing the ring closure mixture which is present after the cyclization at a temperature of at least 110° C., preferably from 110 to 180° C. and, with particular preference, from 135 to 165° C. using water or dilute phosphoric acid under pressure, and subsequently isolating the mixed-crystal pigment, directly or following a fine division step and/or a finish treatment.

The ring closure agent generally used is from 3 to 10 times, preferably from 3 to 5 times, the amount of polyphosphoric acid or its methyl ester, based on the dianilinoterephthalic acid. The $P_2O_5$ content of the polyphosphoric acid or ester is between 80 and 85% by weight, preferably between 83 and 85% by weight, corresponding to a phosphoric acid equivalent of from 110 to 120%. Larger amounts of ring closure agent can be used but are generally unnecessary. The ring closure temperature is generally from 80 to 150° C., preferably from 120 to 140° C. In the ring closure reaction it is also possible for inert solvents, such as aromatic hydrocarbons, for example, to be present. The time to complete cyclization is generally from 0.5 to 24 hours, but usually only 1 to 2 hours.

The ring closure mixtures which are present after the cyclization are hydrolyzed at a temperature of at least 110° C. using water or dilute phosphoric acid, alone or in the presence of an organic solvent which is inert under the reaction conditions, such as an aromatic hydrocarbon, for example, hydrolysis being carried out under pressure. Water or dilute phosphoric acid is used for the hydrolysis. In this case the ring closure mixture is metered under pressure into the water or the dilute phosphoric acid. Alternatively, the converse procedure can be adopted. The hydrolysis can be conducted continuously or batchwise. Advantageously, it is conducted continuously in a static mixer. Based on the polyphosphoric acid, from 2 to 10 times the amount of water or dilute phosphoric acid are generally employed. The duration of the hydrolysis is dependent on the metering rate of the ring closure melt and is, for example, from 0.5 to 24 hours, preferably from 0.5 to 5 hours.

By virtue of the choice of the dianilinoterephthalic acids, of the ring closure conditions and of the high-temperature hydrolysis conditions, functional mixed-crystal pigments which can be isolated by customary methods are obtained directly after the hydrolysis. It may be advantageous to subject the resulting finely divided mixed crystals (in this case referred to as prepigments) to a finish treatment at elevated temperatures, or else first of all coarsely crystalline crude mixed-crystal pigments are obtained, which are advantageously subjected to mechanical fine division and, directly or following a finish treatment, are converted into a functional pigmentary form.

With or without isolation beforehand, the mixed-crystal prepigments are subjected to an aftertreatment with or without the addition of solvents at a temperature of from 50 to 200° C. and, following the separation of the liquid medium, are isolated. The liquid medium can preferably have an alkaline pH, e.g., from 7.5 to 13.

The coarsely crystalline crude mixed-crystal pigments are subjected to mechanical fine division and then the resulting mixed-crystal pigments are isolated in a customary manner or the resulting mixed-crystal prepigments, with or without isolation beforehand, are subjected to a finish treatment as described above and, following the separation of the liquid medium, are isolated. Fine division can take place by dry or wet grinding. Preference is given to wet grinding with high energy input, since for this purpose it is not necessary to dry the crude mixed-crystal pigment. Dry grinding is suitably conducted using all batchwise or continuous vibrating mills or roll mills, and wet grinding using all batchwise or continuous stirred ball mills, roll mills and vibrating mills, and also kneading apparatus.

In order to improve the color properties and to obtain particular color effects, it is possible at any point in the process to add solvents, pigment dispersants, surfactants, defoamers, extenders or other additives. It is also possible to use mixtures of these additives.

Examples of surfactants which are used in the context of the process are cationic, anionic or nonionic surfactants, preferably fatty acid taurides, fatty acid sarcosides, fatty alcohol polyglycol ethers, fatty alcohol polyglycol esters, alkyl polyglycol ether sulfates, alkylphenol polyglycol ethers, alkanesulfonic acids and their salts, alkylphenylsulfonic acids and their salts, and alkylphenol polyglycol ether sulfates.

Pigment dispersants which may be employed in the context of the process are compounds having the formula (II)

$$P\text{---}X_m \qquad (II)$$

in which

P is an m-valent radical of a linear quinacridone of the formula (I) in which $R^1$ and $R^2$ are identical and are hydrogen atoms or methyl groups, X is a group of the formula (III)

$$—COOM \quad (III)$$

or a group of the formula (IV)

$$SO_3M \quad (IV)$$

in which

M is the hydrogen ion H⁺ or the equivalent $M^{r+}/r$ of an r-valent metal cation, r for the case in question then corresponding to one of the numbers 1, 2 and 3, examples being $Li^{1+}$, $Na^{1+}$, $K^{1+}$, $Mg^{2+}$, $Ca^{2+}$, $Sr^{2+}$, $Ba^{2+}$, $Mn^{2+}$, $Cu^{2+}$, $Ni^{2+}$, $Co^{2+}$, $Zn^{2+}$, $Fe^{2+}$, $Al^{3+}$, $Cr^{3+}$ or $Fe^{3+}$; or an ammonium ion or alkylammonium ion, or X is a phthalimidomethylene group or a sulfonamido group.

Per unit weight of crude mixed-crystal pigment, mixed-crystal prepigment or mixed-crystal pigment it is possible judiciously to add in total between 0.1 and 20% by weight, preferably from 3 to 10% by weight, of surfactants and/or pigment dispersants.

Preferred organic solvents which can be used in one or more steps of the preparation process are alkanols, especially ethanol, propanols, butanols and pentanols; aliphatic carboxamides, especially formamide or dimethylformamide; cyclic carboxamides, especially N-methylpyrrolidone; aromatic hydrocarbons, such as toluene, xylenes or ethylbenzene, for example; and aromatic chlorinated hydrocarbons such as chlorobenzene or o-dichlorobenzene, for example.

It was surprising and unforeseeable that pure mixed-crystal pigments are obtained as a result of the high-temperature hydrolysis, whereas according to the information in U.S. Pat. No. 3,160,510 quinacridone mixed-crystal pigments (and not mixtures) are obtained only when the unsubstituted quinacridone is present in a much lower proportion than in the case of the present invention. Furthermore, according to the information in U.S. Pat. No. 4,099,980, the solvolysis of ring closure mixtures in the above composition produces mixed-crystal pigments in the γ-phase of the unsubstituted quinacridone, whereas in accordance with the present process the mixed-crystal pigments formed are present in the β-phase.

The mixed-crystal pigments obtainable in accordance with the present invention are notable for their outstanding coloristic and rheological properties, and especially for their high flocculation stability, ease of dispersibility, good luster characteristics, and high color strength.

In comparison to the mixed crystals known to date, such as in EP-A-2-247 576, in EP 0 822 460 or EP 0 827 039, for example, the use of the present quinacridone mixed crystals leads to greatly improved coloristic properties in the toner. At a given concentration of pigment, the toner exhibits higher color strength and higher transparency and the hue is cleaner. There is little electrostatic influence on the binder system, thereby allowing easy fine-tuning of the desired triboelectric charge by means, for example, of charge control agents.

Furthermore, the environmentally friendly preparation of the colorant results in a more favorable overall environmental balance for the color toner.

As well as in electrophotographic toners and developers, the present mixed crystals can also be used as colorants in powders and coating materials, especially in triboelectrically or electrokinetically sprayed powder coating materials as used to coat the surfaces of articles made, for example, from metal, wood, textile material, paper or rubber. The powder coating or powder obtains its electrostatic charge in general by one of the two following methods:

a) in the case of the corona method, the powder coating material or powder is guided past a charged corona and is charged in the process;

b) in the case of the triboelectric or electrokinetic method, the principle of frictional electricity is utilized.

Typical powder coating resins employed are epoxy resins, carboxyl- and hydroxyl-containing polyester resins, polyurethane resins and acrylic resins together with the customary hardeners. Resin combinations are also used. For example, epoxy resins are frequently employed in combination with carboxyl- and hydroxyl-containing polyester resins.

Furthermore, the improved triboelectric influence of the colorant may result in an improvement in the electret properties in the case of colored (pigmented) electret materials, typical electret materials being based on polyolefins, halogenated polyolefins, polyacrylates, polyacrylonitriles, polystyrenes or fluoropolymers, examples being polyethylene, polypropylene, polytetrafluoroethylene and perfluorinated ethylene and propylene, or on polyesters, polycarbonates, polyamides, polyimides, polyether ketones, polyarylene sulfides, especially polyphenylene sulfides, polyacetals, cellulose esters, polyalkylene terephthalates, and mixtures thereof. Electret materials have numerous fields of use and may acquire their charge through corona charging or triboelectric charging (ref.: G.M. Sessler, "Electrets", Topics in Applied Physics, Vol 33, Springer Verlag, New York, Heidelberg, 2nd Ed., 1987).

Furthermore, the improved triboelectric influence of the colorant may result in improved separation characteristics of colored (pigmented) polymers which are separated by electrostatic methods (Y. Higashiyau, J. of Electrostatics, 30, pages 203–212, 1993). Accordingly, the inherent triboelectric effect of pigments is important for the mass coloring of plastics as well. The inherent triboelectric effect is also significant in process or processing steps which entail intense frictional contact, examples being spinning processes, film-drawing processes or other shaping processes.

The present mixed crystals can be shaded coloristically by mixing with other pigments.

A task frequently encountered in connection with electrophotographic color toners, triboelectrically spraying powder coating materials or inkjet inks is to shade the hue and adapt it to the requirements of the specific application. Particularly appropriate for this purpose are further organic color pigments, inorganic pigments, and dyes.

For shading the hue it is preferred to employ further organic color pigments in mixtures with the quinacridone mixed crystals in concentrations of between 0.01 and 50% by weight, preferably between 0.1 and 25% by weight and, with particular preference, between 0. 1% and 15% by weight, based on the mixed crystal. In this case the further organic color pigments can be from the group of the azo pigments or polycyclic pigments.

In one particularly preferred variant a bluish magenta quinacridone mixed crystal can be shaded by yellowish or carmine-colored pigment types, such as P.R. 146, P.R. 207, P.R. 209, P.R. 186, P.R. 48, for example, in the manner of a 2-component mixture. Mixtures of a plurality of components are likewise suitable. Relatively large steps in hue are possible, for example, using orange pigments such as P.O. 62, P.O. 36, P.O. 34, P.O. 13, P.O. 43 or P.O. 5 or yellow pigments such as P.Y. 12, 13, 17, 83, 155, 180, 185 or 97.

The mixtures can be prepared in the form of powders, by mixing presscakes, spray-dried presscakes or masterbatches and by dispersion (extrusion, kneading, roll-mill processes, bead mills, Ultra-turrax) in the presence of a carrier material in solid or liquid form (aqueous and nonaqueous inks) and by flushing in the presence of a carrier material.

If the colorant is used with high proportions of water or solvent (>5%), then mixing can also take place at elevated temperatures with vacuum assistance.

Particularly appropriate for increasing the brightness and, in some cases, for shading the hue at the same time are mixtures with organic dyes. Preferred such dyes are water-soluble dyes, such as direct, reactive and acid dyes, and also solvent-soluble dyes, such as solvent dyes, disperse dyes and vat dyes. Specific examples that may be mentioned are C.I. Reactive Yellow 37, Acid Yellow 23, Reactive Red 23, 180, Acid Red 52, Reactive Blue 19, 21, Acid Blue 9, Direct Blue 199, Solvent Yellow 14, 16, 25, 56, 64, 79, 81, 82, 83:1, 93, 98, 133, 162, 174, Solvent Red 8, 19, 24, 49, 89, 90, 91, 109, 118, 119, 122, 127, 135, 160, 195, 212, 215, Solvent Blue 44, 45, Solvent Orange 60, 63, Disperse Yellow 64, Vat Red 41.

It is also possible to use dyes and pigments having fluorescent properties, such as ®Luminols (Riedel-de Haen), in concentrations of from 0.0001 to 30% by weight, preferably from 0.001 to 15% by weight and, with very particular preference, between 0.001 and 5%, based on the mixed crystal, in order, for example, to produce forgeryproof toners.

Inorganic pigments, such as $TiO_2$ or $BaSO_4$, are used in mixtures for lightening. Also suitable are mixtures of quinacridone mixed crystals with effect pigments, such as pearl luster pigments, $Fe_2O_3$ pigments (®Paliocroms) and pigments based on cholesteric polymers, for example, which give different perceived colors depending on the viewing angle.

The mixed crystals employed in accordance with the invention can also be combined with numerous charge control agents, providing either positive or negative control, in order to achieve good performance chargeability. The simultaneous use of positive and negative charge control agents is a further option.

Examples of suitable charge control agents are: triphenylmethanes; ammonium and immonium compounds; iminium compounds; fluorinated ammonium and fluorinated immonium compounds; biscationic acid amides; polymeric ammonium compounds; diallylammonium compounds; aryl sulfide derivatives; phenol derivatives; phosphonium compounds and fluorinated phosphonium compounds; calix(n) arenes; cyclically linked oligosaccharides (cyclodextrins) and their derivatives, especially boron ester derivatives, interpolyelectrolyte complexes (IPECs); polyester salts; metal complex compounds, especially salicylate-metal and salicylate-nonmetal complexes, α-hydroxycarboxylic acid-metal and -nonmetal complexes; benzimidazolones; and azines, thiazines or oxazines which are listed in the Colour Index as Pigments, Solvent Dyes, Basic Dyes or Acid Dyes.

Examples of charge control agents which can be combined individually or in combination with one another with the mixed-crystal pigment of the invention are: triarylmethane derivatives such as, for example:
Colour Index Pigment Blue 1, 1:2, 2, 3, 8, 9, 9:1, 10, 10:1, 11, 12, 14, 18, 19, 24, 53, 56, 57, 58, 59, 61, 62, 67 or, for example, Colour Index Solvent Blue 2, 3, 4, 5, 6, 23, 43, 54, 66, 71, 72, 81, 124, 125, and also the triarylmethane compounds listed in the Colour Index under Acid Blue and Basic Dye, provided they are suitable in terms of their thermal stability and processing properties, such as, for example, Colour Index Basic Blue 1, 2, 5, 7, 8, 11, 15, 18, 20, 23, 26, 36, 55, 56, 77, 81, 83, 88, 89, Colour Index Basic Green 1, 3, 4, 9, 10, with Colour Index Solvent Blue 125, 66 and 124 in turn possessing special suitability.

Colour Index Solvent Blue 124, in the form of its highly crystalline sulfate or of the trichlorotriphenylmethyltetrachloroaluminate, is particularly suitable.

Metal complexes bearing the CAS Numbers 84179-66-8 (chromium azo complex), 115706-73-5 (iron azo complex), 31714-55-3 (chromium azo complex), 84030-55-7 (chromium salicylate complex), 42405-40-3 (chromium salicylate complex) and also the quaternary ammonium compound CAS No.116810-46-9 and also aluminum azo complex dyes, metal carboxylates and sulfonates.

Examples of charge control agents of the triphenylmethane series that are highly suitable for the production of electret fibers are the compounds described in DE-A-1 919 724 and DE-A-1 644 619.

Of particular interest are triphenylmethanes as described in U.S. Pat. No. 5,051,585, especially those of the formula (2)

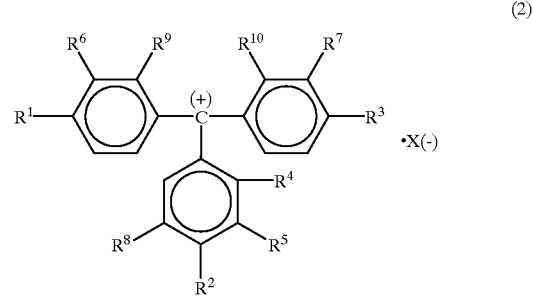

(2)

in which $R^1$ and $R^3$ are phenylamino groups, $R^2$ is an m-methylphenylamino group, and the radicals $R^4$ to $R^{10}$ are all hydrogen.

Also suitable are ammonium and immonium compounds as described in U.S. Pat. No. 5,015,676, and fluorinated ammonium and immonium compounds as described in U.S. Pat. No. 5,069,994, especially those of the formula (3)

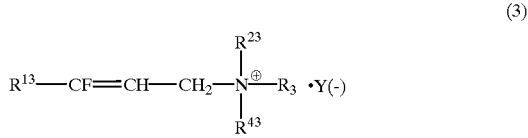

(3)

in which $R^{13}$ is perfluorinated alkyl of 5 to 11 carbon atoms, $R^{23}$, $R^{33}$ and $R^{43}$ are identical or different and are alkyl of 1 to 5, preferably 1 to 2, carbon atoms, and Y is a stoichiometric equivalent of an anion, preferably of a tetrafluoroborate or tetraphenylborate anion.

Also suitable are biscationic acid amides, as described in WO 91/10172, especially those of the formula (4)

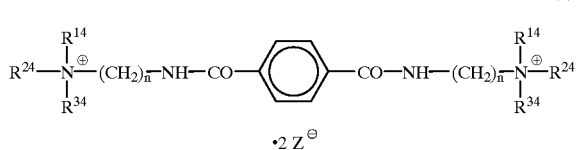

(4)

in which
  $R^{14}$, $R^{24}$ and $R^{34}$ are identical or different alkyl radicals of 1 to 5 carbon atoms, preferably methyl,
  n is an integer from 2 to 5, and
  $Z^-$ is a stoichiometric equivalent of an anion, preferably a tetraphenylborate anion.

Further suitable compounds are diallylammonium compounds as described in DE-A-4 142 541, especially those of the formula (5)

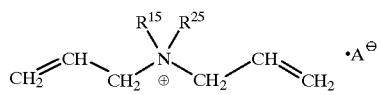

(5)

in which
  $R^{15}$ and $R^{25}$ are identical or different alkyl groups of 1 to 5, preferably 1 or 2, carbon atoms, but especially methyl groups, and
  $A^-$ is a stoichiometric equivalent of an anion, preferably a tetraphenylborate anion, and also the polymeric ammonium compounds obtainable therefrom of the formula (6), as described in DE-A-4 029 652 or DE-A-4 103 610,

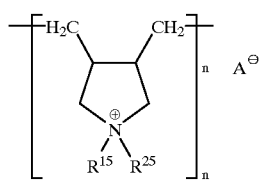

(6)

in which n has a value corresponding to molecular weights of from 5000 to 500,000 g/mol, preferably molecular weights of from 40,000 to 400,000 g/mol.

Also suitable are aryl sulfide derivatives as described in DE-A4 031 705, especially those of the formula (7)

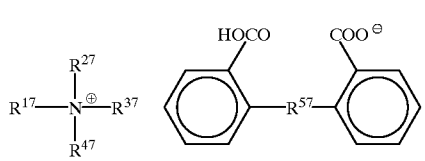

(7)

in which
  $R^{17}$, $R^{27}$, $R^{37}$ and $R^{47}$ are identical or different alkyl groups of 1 to 5, preferably 2 or 3, carbon atoms, and
  $R^{57}$ is one of the divalent radicals —S—, —S—S—, —SO— and —SO$_2$.

For example, $R^{17}$ to $R^{47}$ are propyl groups and $R^{57}$ is the group —S—S—.

Also suitable are phenol derivatives as described in EP-A-0 258 651, especially those of the formula (8)

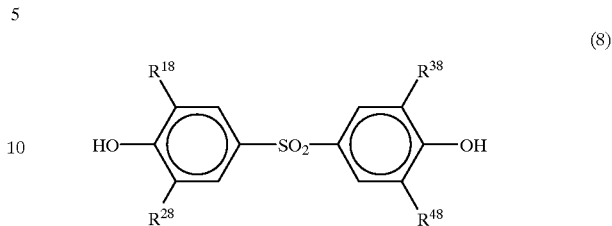

(8)

in which
  $R^{18}$ and $R^{38}$ are alkyl or alkenyl groups of 1 to 5, preferably 1 to 3, carbon atoms and
  $R^{28}$ and $R^{48}$ are hydrogen or alkyl of 1 to 3 carbon atoms, preferably methyl.

Also suitable are phosphonium compounds and fluorinated phosphonium compounds, as described in U.S. Pat. No. 5 021 473 and in U.S. Pat. No. 5 147 748.

Other suitable compounds include calix(n)arenes, as described in EP-A-0 385 580, EP-A-0 516 434 and in Angew. Chemie (1993), 195, 1258.

Further suitable compounds are metal complex compounds, such as chromium-, cobalt-, iron-, zinc- or aluminum-azo complexes or chromium-, cobalt-, iron-, zinc- or aluminum-salicylic or boric acid complexes of the formula (14)

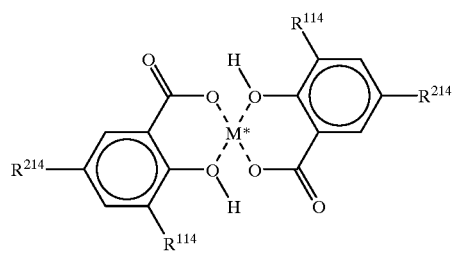

(14)

in which
  $M^-$ is a divalent central metal atom, preferably a chromium, aluminum, iron, boron or zinc atom,
  $R^{114}$ and $R^{214}$ are identical or different straight-chain or branched alkyl groups of 1 to 8, preferably 3 to 6, carbon atoms, an example being tert-butyl.

Also suitable are benzimidazolones as described in EP-A-0 347 695.

Further suitable compounds are cyclically linked oligosaccharides as described in DE-A-4 418 842, especially those of the formula (16)

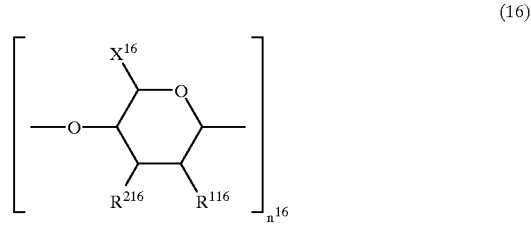

(16)

in which $n^{16}$ is a number between 3 and 100, $R^{116}$ and $R^{216}$ are OH, $OR^{316}$, where $R^{316}$ is substituted or unsubstituted $C_1$–$C_{18}$-alkyl, $C_6$–$C_{12}$-aryl or tosyl, and $X^{16}$ is $CH_2OH$ or $CH_2COR^{316}$. Examples that may be mentioned include:

$n^{16}=6$, $R^{116}$ and $R^{216}=OH$, $X^{16}=CH_2OH$ $n^{16}=7$, $R^{116}$ and $R^{216}=OH$, $X^{16}=CH_2OH$ $n^{16}=8$, $R^{116}$ and $R^{216}=OH$, $X^{16}=CH_2OH$.

Further suitable compounds are polymer salts, as described in DE-AX 332 170, whose anionic component is a polyester consisting of the product of reaction of the individual components a), b) and c) and also, if desired, d) and, if desired, e), where a) is a dicarboxylic acid or a reactive derivative of a dicarboxylic acid, being free of sulfo groups, b) is a difunctional aromatic, aliphatic or cycloaliphatic sulfo compound whose functional groups are hydroxyl or carboxyl, or hydroxyl and carboxyl, c) is an aliphatic, cycloaliphatic or aromatic diol, a polyetherdiol or a polycarbonatediol, d) is a polyfunctional compound (functionality>2) whose functional groups are hydroxyl or carboxyl, or hydroxyl and carboxyl, and e) is a monocarboxylic acid and whose cationic components are hydrogen atoms or metal cations.

Also suitable are cyclooligosaccharide compounds, as are described, for example, in DE-A-1 971 1260, which are obtainable by reacting a cyclodextrin or cyclodextrin derivative with a compound of the formula

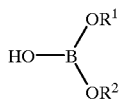

in which $R^1$ and $R^2$ are alkyl, preferably $C_1$–$C_4$-alkyl.

Also suitable are interpolyelectrolyte complexes as are described, for example, in DE-A-197 32 995. Particularly suitable such compounds are those featuring a molar ratio of polymeric cationic to polymeric anionic groups of from 0.9:1.1 to 1.1:0.9.

Further suitable compounds, especially when using quinacridone mixed crystals in liquid toners (Handbook of Imaging Materials, 1991, Marcel Dekker, Inc., Chapter 6, Liquid Toner Technology), are surface-active ionic compounds and metal soaps.

Particularly suitable are alkylated arylsulfonates, such as barium petronates, calcium petronates, barium dinonylnaphthalenesulfonates (basic and neutral), calcium dinonylsulfonate or sodium dodecylbenzenesulfonate, and polyisobutylenesuccinimides (Chevron's Oloa 1200).

Soya lecithin and N-vinylpyrrolidone polymers are also suitable.

Also suitable are sodium salts of phosphated mono- and diglycerides of saturated and unsaturated substituents, AB diblock copolymers of A: polymers of 2-(N,N)-dimethylaminoethyl methacrylate quaternized with methyl p-toluenesulfonate, and B: poly-2-ethylhexyl methacrylate.

Also suitable, especially in liquid toners, are divalent and trivalent carboxylates, especially aluminum tristearate, barium stearate, chromium stearate, magnesium octoate, calcium stearate, iron naphthalite and zinc naphthalite.

Suitability extends to chelating charge control agents, as described in EP 0 636 945 A1, metallic (ionic) compounds, as described in EP 0 778 501 A1, phosphate metal salts, as described in JA 9 (1997)-106107, azines of the following Colour Index Numbers: C.I. Solvent Black 5, 5:1, 5:2, 7, 31 and 50; C.I. Pigment Black 1, C.I. Basic Red 2 and C.I. Basic Black 1 and 2.

The combination of quinacridone mixed crystal and charge control agent can be effected by means of physical mixing, during the mixed-crystal preparation, during the finish operation, or by appropriate application to the surface of the mixed-crystal pigment (pigment coating). Both components can also advantageously be added in the case of polymerization toners, for which the binder is polymerized in the presence of the quinacridone mixed-crystal pigment and of the charge control agent, or can be used in the preparation of liquid toners in high-boiling inert solvents, such as hydrocarbons.

The invention therefore also provides an electrophotographic toner or developer comprising a toner binder, from 0.1 to 60% by weight, preferably from 0.5 to 20% by weight, of shaded or unshaded mixed-crystal pigment, and from 0 to 20% by weight, preferably from 0.1 to 5% by weight, based in each case on the overall weight of the toner or developer, of a charge control agent from the class of the triphenylmethanes, ammonium and immonium compounds; fluorinated ammonium and immonium compounds; biscationic acid amides; polymeric ammonium compounds; diallylammonium compounds; aryl sulfide derivatives; phenol derivatives; phosphonium compounds and fluorinated phosphonium compounds; calix(n)arenes; cyclodextrins; polyester salts; metal complex compounds; cyclooligosaccharide-boron complexes, interpolyelectrolyte complexes; benzimidazolones; azines, thiazines or oxazines.

It is also possible to add further components to the toner, such as waxes, which may be of animal, vegetable or mineral origin, synthetic waxes, or mixtures thereof. Waxes are understood to be substances which are kneadable at 20° C., ranging from firm to hard and fragile, from coarse to finely crystalline, and from translucent to opaque, but not glasslike. In addition, a light stabilizer can be added to the mixed-crystal pigment in the toner. Subsequently, free flow agents, such as $TiO_2$ or highly disperse silica, can also be added to the toner.

Particular preference is given to electrophotographic toners or developers comprising virtually colorless compounds as charge control agents. The charge control agents can also be added to the pigment in the form of moist presscakes, masterbatches or powders. Preference is given to mixtures with the compounds of the abovementioned formula (3); of the abovementioned formula (5), in which $R^{15}$ and $R^{25}$ are each methyl and $A\theta$ is a tetraphenylborate anion; of the abovementioned formula (6) in which $R^{15}$ and $R^{25}$ are each methyl, $A\theta$ is a tetraphenyl borate anion and n has a value corresponding to molecular weights of from 5000 to 500,000 g/mol; of the abovementioned formula (7);

of the abovementioned formula (14);

or with an abovementioned polymer salt whose anionic component is a polyester.

The invention additionally provides a powder or powder coating material comprising an acrylic resin or polyester resin containing epoxy, carboxyl or hydroxyl groups, or a combination of such resins, from 0.1 to 60% by weight, preferably from 0.5 to 20% by weight, of shaded or unshaded mixed-crystal pigments, and from 0 to 20% by weight, preferably from 0.1 to 5% by weight, based in each case on the overall weight of the powder or powder coating material, of a charge control agent selected from the preferred compounds and classes mentioned above for electrophoto-graphic toners.

The quinacridone mixed-crystal pigment used in accordance with the invention is judiciously incorporated homogeneously, for example by extrusion or kneading, or added during the polymerization of the binder, in a concentration of from 0.1 to 60% by weight, preferably from 0.5 to 20% by weight and, with particular preference, from 0.1 to 5.0% by weight, based on the overall mixture, into the binder of the respective toner (liquid or dry), developer, powder coating material, electret material or polymer for electrostatic separation. In this context, the mixed-crystal pigment and the abovementioned charge control agent can also be added in the form of dried and ground powders, dispersions or suspensions in, for example, organic and/or inorganic solvents, presscakes (which can be used, for example, for the flush process), spray-dried presscakes as described below, masterbatches, preparations, made-up pastes, and as compounds applied to suitable carriers, examples being kieselguhr, $TiO_2$, $Al_2O_3$, from aqueous or nonaqueous solution, or in some other form. The mixed-crystal pigment content in the presscake and masterbatch is usually between 5 and 70% by weight, preferably between 20 and 50% by weight. Furthermore, the mixed-crystal pigment can also be used as a highly concentrated presscake, especially as a spray-dried presscake, in which case the pigment content is between 25 and 95% by weight, preferably between 50 and 90% by weight. The spray-dried presscake can be prepared in accordance with customary methods.

The level of the electrostatic charge of the electrophotographic toners or of the powder coatings into which the pigment of the invention is homogeneously incorporated cannot be predicted and is measured on standard test systems under identical conditions (identical dispersion times, identical particle size distribution, identical particle morphology) at approximately 20° C. and 50% relative atmospheric humidity. The electrostatic charging of the toner is carried out by fluidization with a carrier, i.e. a standardized friction partner (3 parts by weight of toner per 97 parts by weight of carrier) on a bed of rolls (150 revolutions per minute). Subsequently, the electrostatic charging is measured on a customary q/m measurement setup (J. H. Dessauer, H. E. Clark, "Xerography and related Processes", Focal Press, N.Y., 1965, page 289; J. F. Hughes, "Electrostatic Powder Coating", Research Studies Press Ltd. Letchworth, Hertfordshire, England, 1984, Chapter 2).

The triboelectric spraying of the powders or powder coating materials is carried out using a spraying apparatus with a standard spray pipe and a star-shaped inner rod at maximum powder throughput with a spray pressure of 3 bar. For this purpose, the article to be sprayed is suspended in a spray booth and is sprayed from a distance of about 20 cm directly from the front, without any further movement of the spraying apparatus. The charge of each sprayed powder is then measured using a "Device for measuring the triboelectric charge of powders" from Intec (Dortmund). To carry out the measurement, the antenna of the measuring device is held directly in the cloud of powder emerging from the spraying apparatus. The current strength resulting from the electrostatic charge of powder coating material or powder is displayed in $\mu A$. The deposition rate is determined subsequently in % by differential weighing of the sprayed and of the deposited powder coating material.

The transparency of the quinacridone mixed-crystal pigment in toner binder systems is investigated as follows: 30 parts by weight of the pigmented test toner are stirred with a dissolver (5 minutes at 5000 rpm) into 70 parts by weight of a base varnish (consisting of 15 parts by weight of the respective toner resin and 85 parts by weight of ethyl acetate).

The test toner varnish produced in this way is knife-coated onto suitable paper (e.g., letterpress paper), using a manual coater, against a standard pigmented varnish produced in the same way. A suitable size for the coater bar is, for example, K bar N 3 (=24 $\mu m$ coat thickness). To allow better determination of transparency, the paper has printed on it a black bar, and the transparency differences in terms of dL values are determined in accordance with DIN 55 988 or evaluated in accordance with the test procedure from Pigments Marketing, Clariant GmbH "Visuelle und Farbmetrische Bewertung von Pigmenten" [Visual and calorimetric evaluation of pigments] version 3, 1996 (No. 1/1).

It has also been found that the quinacridone mixed-crystal pigments are suitable as colorants in aqueous (including microemulsion inks) and nonaqueous ("solvent-based") ink-jet inks, and in those inks which operate in accordance with the hot-melt technique.

Microemulsion inks are based on organic solvents, water and, if desired, an additional hydrotropic substance (interface mediator). Nonaqueous inks contain essentially organic solvents and, if desired, a hydrotropic substance.

Hot-melt inks are based mostly on waxes, fatty acids, fatty alcohols or sulfonamides which are solid at room temperature and liquefy when heated, the preferred melting range lying between about 60° C. and about 140° C.

The invention also provides a hot-melt inkjet ink consisting essentially of from 20 to 90% by weight of wax and from 1 to 10% by weight of the quinacridone mixed-crystal pigment. Also present there may be from 0 to 20% by weight of an additional polymer (as "colorant dissolver"), from 0 to 5% by weight of dispersing auxiliaries, from 0 to 20% by weight of viscosity modifiers, from 0 to 20% by weight of plasticizers, from 0 to 10% by weight of tack additive, from 0 to 10% by weight of transparency stabilizer (prevents, e.g., crystallization of waxes), and from 0 to 2% by weight of antioxidant. Typical additives and auxiliaries are described, for example, in U.S. Pat. No. 5,560,760.

The present invention additionally provides inkjet recording liquids which comprise one or more of the quinacridone mixed-crystal pigments.

The finished recording liquids generally include in total from 0.5 to 15% by weight, preferably from 1.5 to 8% by weight, of quinacridone mixed-crystal pigments, calculated on a dry basis.

Microemulsion inks contain from 0.5 to 15% by weight, preferably from 1.5 to 8% by weight, of a quinacridone mixed-crystal pigment, from 5 to 99% by weight of water and from 0.5 to 94.5% by weight of organic solvent and/or hydrotropic compound.

"Solvent based" inkjet inks contain preferably from 0.5 to 15% by weight of a quinacridone mixed-crystal pigment, and from 85 to 94.5% by weight of organic solvent and/or hydrotropic compounds.

Water used to prepare the recording liquids is used preferably in the form of distilled or deionized water.

The solvents present in the recording liquids can comprise an organic solvent or a mixture of such solvents. Examples of suitable solvents are mono- or polyhydric alcohols, their ethers and esters, e.g. alkanols, especially those of 1 to 4 carbon atoms, such as methanol, ethanol, propanol, isopropanol, butanol and isobutanol; dihydric or trihydric alcohols, especially those of 2 to 5 carbon atoms, examples being ethylene glycol, propylene glycol, 1,2-propanediol, 1,4-butanediol, 1,5-pentanediol, 1,6-hexanediol, 1,2,6-hexanetriol, glycerol, diethylene glycol, dipropylene glycol, triethylene glycol, polyethylene glycol, tripropylene glycol, polypropylene glycol; lower alkyl ethers of polyhydric alcohols, such as ethylene glycol monomethyl, monoethyl or monobutyl ether, triethylene glycol monomethyl or monoethyl ether; ketones and ketone alcohols such as, for example, acetone, methyl ethyl ketone, diethyl ketone, methyl isobutyl ketone, methyl pentyl ketone, cyclopentanone, cyclohexanone and diacetone alcohol; amides, such as dimethylformamide, dimethylacetamide and N-methylpyrrolidone, toluene and n-hexane, for example.

Hydrotropic compounds which may also act as solvents, include for example formamide, urea, tetramethylurea, e-caprolactam, ethylene glycol, diethylene glycol, triethylene glycol, polyethylene glycol, butyl glycol, methyl-Cellosolve, glycerol, N-methylpyrrolidone, 1,3-diethyl-2-imidazolidinone, thiodiglycol, sodium benzenesulfonate, Na xylenesulfonate, Na toluenesulfonate, sodium cumenesulfonate, Na dodecylsulfonate, Na benzoate, Na salicylate or sodium butyl monoglycol sulfate.

The recording liquids of the invention may also include other customary additives, examples being preservatives, cationic, anionic or nonionic surface-active substances (surfactants and wetting agents), and also viscosity regulators, e.g., polyvinyl alcohol, cellulose derivatives, or water-soluble natural or synthetic resins as film formers and/or binders for increasing the adhesion and abrasion resistance.

Amines, such as ethanolamine, diethanolamine, triethanolamine, N,N-dimethyl-ethanolamine or diisopropylamine, for example, serve primarily to increase the pH of the recording liquid. They are normally present in the recording liquid in a proportion of from 0 to 10%, preferably from 0.5 to 5%, by weight.

The inkjet inks of the invention can be prepared by dispersing the quinacridone mixed-crystal pigments—in the form of a powder, an aqueous or nonaqueous preparation, a suspension or a presscake—into the microemulsion medium or into the nonaqueous medium or into the wax for preparing a hot-melt inkjet ink. The presscake can also be a highly concentrated presscake, especially a spray-dried presscake.

Furthermore, the quinacridone mixed-crystal pigments are also suitable as colorants for color filters, both for substractive and for additive color generation (P. Gregory "Topics in Applied Chemistry: High Technology Application of Organic Colorants" Plenum Press, New York 1991, pp. 15–25).

In the examples below, parts and percentages are by weight.

SYNTHESIS EXAMPLE 1

392 parts of polyphosphoric acid containg 85.0% $P_2O_5$ are metered into a pressure vessel. Then 70.5 parts of 2,5-dianilinoterephthalic acid and 7.8 parts of 2,5-di-(4-toluidino)terephthalic acid are introduced with stirring at from 80 to 90° C. and the mixture is heated at 125° C. for 1 hour, during which ring closure takes place to form the quinacridone. The reaction mixture is subsequently metered into a second pressure vessel and is hydrolyzed under pressure and with stirring with a mixture of 1762 parts of 30% strength phosphoric acid at 140° C. In the course of hydrolysis the temperature rises to 155° C. The mixture is stirred at 155° C. for 0.5 hours. It is subsequently cooled to 60° C., and the mixed-crystal pigment is filtered off with suction, washed to neutrality with water and dried at 80° C. 70.2 parts of mixed-crystal pigment are obtained. The spectrum is that of the mixed-crystal pigment. This spectrum differs from the spectrum of unsubstituted β-phase quinacridone in an additional reflection at 13.73° (2θ). The typical reflections of 2,9-dimethylquinacridone at 11.05 and 25.31° (2θ) are not detectable.

SYNTHESIS EXAMPLE 2

9 parts of mixed-crystal pigment prepared in accordance with synthesis example 1 and 1 part of pigment dispersant of the formula (II) are mixed mechanically. In this formula (II) P is the radical of linear unsubstituted quinacridone and X is a group of the formula $-SO_2-NH-(CH_2)_3-N(C_2H_5)_2$.

SYNTHESIS EXAMPLE 3

382 parts of polyphosphoric acid containg 85.0% $P_2O_5$ are metered into a pressure vessel. Then 64.9 parts of 2,5-dianilinoterephthalic acid and 11.5 parts of 2,5-di-(4-toluidino)terephthalic acid are introduced with stirring at from 80 to 90° C. and the mixture is heated at 125° C. for 1 hour, during which ring closure takes place to form the quinacridone. The reaction mixture is subsequently metered into a second pressure vessel and is hydrolyzed under pressure and with stirring with a mixture of 1721 parts of 30% strength phosphoric acid at 140° C. In the course of hydrolysis the temperature rises to 155° C. The mixture is stirred at 155° C. for 0.5 hours. It is subsequently cooled to 60° C., and the mixed-crystal pigment is filtered off with suction, washed to neutrality with water and dried at 80° C. 68.6 parts of mixed-crystal pigment are obtained. The spectrum is that of the mixed-crystal pigment. The typical reflections of 2,9-dimethylquinacridone are not detectable.

SYNTHESIS EXAMPLE 4

The procedure of synthesis example 3 is repeated and the 68.6 parts of mixed-crystal pigment are subjected to an isobutanol finish: the mixed-crystal pigment is admixed with 411.6 parts of water and 411.6 parts of 100% isobutanol, the mixture is stirred at 150° C. for 5 hours, and then the isobutanol is removed by distillation.

ELECTROSTATIC PROPERTIES

APPLICATION EXAMPLE 1

5 parts of the mixed-crystal pigment from synthesis example 1, as a powder or as a corresponding amount of presscake, are incorporated homogeneously, using a kneading apparatus, into 95 parts of a toner binder (polyester based on bisphenol A, ®Almacryl T500) over the course of 30 minutes. The product is then ground on a universal laboratory mill and classified on a centrifugal classifier. The desired particle fraction (from 4 to 25 μm) is activated with a carrier consisting of silicone-coated ferrite particles of size 50 to 200 μm (bulk density 2.75 g/cm$^3$) (FBM 96–100 from Powder Techn.).

Measurement is carried out on a conventional q/m measurement setup. A sieve having a mesh size of 25 μm is used to ensure that no carrier is entrained when the toner is blown out. The measurements are made at a relative atmospheric humidity of approximately 50%. As a function of the activation period, the following q/m values [μC/g] are measured:

| Activation period | Charge q/m [μC/g] |
| --- | --- |
| 10 min | −15 |
| 30 min | −12 |
| 2 h | −12 |
| 24 h | −5 |

APPLICATION EXAMPLES 2 to 8

The toner is prepared and the measurements made as in Application Example 1. In all of the examples the fraction of mixed-crystal pigment, calculated as dry mass, is 5%. The pigment content in the presscake (Application Example 2 and 3) and in the masterbatch (Application Example 7) is in each case 30%.

In Application Examples 4, 5 and 6 the amount of charge control agent in the toner is in each case 1%, the proportion of the toner binder therein being only 94%.

points (=much more transparent), a blue shift of the hue, and a higher color strength.

Aqueous and Nonaqueous Inkjet Inks:

EXAMPLE 1

10 parts of a finely ground 50% pigment preparation of a mixed-crystal pigment from synthesis example 1 based on

TABLE

| Application Example | Mixed-crystal pigment from Synthesis Ex. | Mixed-crystal pigment use form | Charge control agent | Triboelectric charging in $\mu$C/g after activation | | | |
|---|---|---|---|---|---|---|---|
| | | | | 10 min | 30 min | 2 h | 24 h |
| 2 | 2 | Presscake | — | −4 | −3 | −3 | −4 |
| 3 | 3 | " | — | −10 | −10 | −8 | −7 |
| 4 | 3 | Powder | A | −9 | −9 | −10 | −10 |
| 5 | 3 | " | B | −10 | −10 | −11 | −10 |
| 6 | 3 | " | C | −5 | −4 | −2 | +2 |
| 7 | 3 | Masterbatch | — | −10 | −10 | −8 | −7 |
| 8 | 4 | Powder | — | −3 | 0 | 0 | −6 |

Charge control agent A:

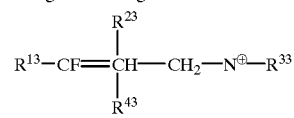

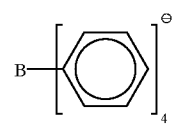

$R^{23}, R^{33}, R^{43} = C_1$—$C_2$-alkyl
$R^{13} = C_5$—$C_{11}$-perfluoroalkyl Charge control agent B:

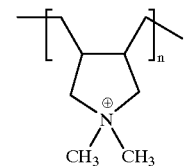

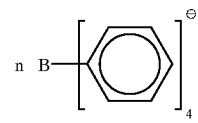

n = 300–600

Charge control agent C: alkyl Cr-salicylate (®Bontron E 84, Orient Chemicals).

The application examples demonstrate that the quinacridone mixed-crystal pigments used in accordance with the invention show very good compatibility with charge control agents. This allows fine-tuning of the triboelectric charging in accordance with the technical apparatus requirements. Even small amounts (1%) of charge control agent give constant long-term charging.

Transparency:

The transparency of the toner from Application Example 1 was measured (24 $\mu$m layer thickness) and compared with the transparency of a similar toner containing, however, a mixed-crystal pigment according to EP-A-0 247 576, Example 3, as colorant. The test toner of the invention exhibited a transparency which is higher by from 3 to 4 vinyl chloride-vinyl acetate copolymer (e.g., ®Vinol 15/45 from Wacker or ®Vilith AS 42 from Hüls), homogeneous pigment dispersion being achieved by intensive kneading into the copolymer, are incorporated with stirring using a dissolver into a mixture of 80 parts of methyl isobutyl ketone and 10 parts of 1,2-propylene glycol.

An inkjet ink having the following composition is obtained:

5 parts of mixed-crystal pigment
5 parts of vinyl chloride-vinyl acetate copolymer
10 parts of 1,2-propylene glycol
80 parts of methyl isobutyl ketone

EXAMPLE 2

5 parts of a pigment formulation from synthesis example 2, in the form of a 40% ultrafine aqueous pigment preparation, are admixed with stirring (paddle stirrer or dissolver) first with 75 parts of deionized water and then with 6 parts of ®Mowilith DM 760 (acrylate dispersion), 2 parts of ethanol, 5 parts of 1,2-propylene glycol and 0.2 parts of ®Mergal K7.

An inkjet ink having the following composition is obained:

5 parts of pigment formulation from synthesis example 2
6 parts of Mowilith DM 760 (acrylate dispersion)
2 parts of ethanol
5 parts of 1,2-propylene glycol
0.2 parts of Mergal K7
81.8 parts of deionized water.

EXAMPLE 3

5 parts of the mixed-crystal pigment from synthesis example 3, in the form of a 40% by weight ultrafine aqueous pigment preparation, are admixed with stirring first with 80 parts of deionized water and then with 4 parts of ®Luviskol K30 (polyvinylpyrrolidone, BASF), 5 parts of 1,2-propylene glycol and 0.2 parts of Mergal K7.

An inkjet ink having the following composition is obained:

5 parts of mixed-crystal pigment
4 parts of Luviskol K30 (polyvinylpyrrolidone)
5 parts of 1,2-propylene glycol
0.2 parts of Mergal K7
85.8 parts of deionized water.

What is claim is:

1. A method of coloring electrophotographic toners and developers, powder coating materials, inkjet inks, electret fibers, and color filters comprising the step of combining a mixed-crystal pigment of the quinacridone series consisting of
   a) from 85 to 99% by weight of unsubstituted β-phase quinacridone of the formula (I)

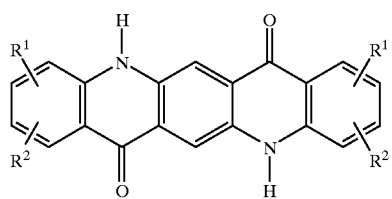

(I)

in which $R^1$ and $R^2$ are hydrogen atoms, and
   b) from 1 to 15% by weight of one or more substituted quinacridones of the formula (I) in which the substituents $R^1$ and $R^2$ are identical or different and are chlorine, bromine or fluorine atoms or $C_1$–$C_4$-alkyl, $C_1$–$C_4$-alkoxy or carboxamido groups, which can be substituted by $C_1$–$C_6$-alkyl groups, and $R^1$ can additionally be hydrogen,
with a toner binder, powder coating resin, electret material, color filter and injet ink base.

2. The method as claimed in claim 1, wherein the mixed-crystal pigment consists of from 87 to 95% by weight of a) and from 5 to 13% by weight of b).

3. The method as claimed in claim 1, wherein the radical $R^1$ in b) is hydrogen, chlorine, methyl or carboxamido and the radical $R^2$ is chlorine, methyl or carboxamido.

4. The method as claimed in claim 1, wherein the mixed-crystal pigment is shaded with a further organic color pigment, an inorganic pigment, or a dye.

5. The method as claimed in claim 1, wherein the mixed-crystal pigment is further combined with a charge control agent from the group consisting of the triphenylmethanes, ammonium and immonium compounds; iminium compounds; fluorinated ammonium and fluorinated immonium compounds; biscationic acid amides; polymeric ammonium compounds; diallylammonium compounds; aryl sulfides; phenols; phosphonium compounds and fluorinated phosphonium compounds; calix(n)arenes; cyclically linked oligosaccharides, interpolyelectrolyte complexes; polyester salts; metal complex compounds, α-hydroxycarboxylic acid-metal and -nonmetal complexes; benzimidazolones; azines, thiazines and oxazines.

6. The method as claimed in claim 1 in liquid toners or powder toners.

7. An electrophotographic toner or developer comprising a toner binder, from 0.1 to 60% by weight, of shaded or unshaded mixed-crystal pigment as set forth in claim 1, and from 0 to 20% by weight, based in each case on the overall weight of the toner or developer, of a charge control agent from the class of the triphenylmethanes, ammonium and immonium compounds; fluorinated ammonium and immonium compounds; biscationic acid amides; polymeric ammonium compounds; diallylammonium compounds; aryl sulfides; phenols; phosphonium compounds and fluorinated phosphonium compounds; calix(n)arenes; cyclodextrins; polyester salts; metal complex compounds; cyclooligosaccharide-boron complexes, interpolyelectrolyte complexes; benzimidazolones; azines, thiazines or oxazines.

8. An electrophotographic toner or developer as claimed in claim 7, containing from 0.5 to 20% by weight, of shaded or unshaded mixed-crystal pigment as set forth in claim 1 and from 0.1 to 5% by weight, based in each case on the overall weight of the toner or developer, of a charge control agent from the class of the triphenylmethanes, ammonium and immonium compounds; fluorinated ammonium and immonium compounds; biscationic acid amides; polymeric ammonium compounds; diallylammonium compounds; aryl sulfides; phenols; phosphonium compounds and fluorinated phosphonium compounds; calix(n)arenes; cyclodextrins; polyester salts; metal complex compounds; cyclooligosaccharide-boron complexes, interpolyelectrolyte complexes; benzimidazolones; azines, thiazines or oxazines.

9. A powder or powder coating material comprising an acrylic resin or polyester resin containing epoxy, carboxyl or hydroxyl groups, or a combination of such resins, from 0.1 to 60% by weight, of shaded or unshaded mixed-crystal pigment as set forth in claim 1, and from 0 to 20% by weight, based in each case on the overall weight of the powder or powder coating material, of a charge control agent from the class of the triphenylmethanes, ammonium and immonium compounds; fluorinated ammonium and immonium compounds; biscationic acid amides; polymeric ammonium compounds; diallylammonium compounds; aryl sulfide derivatives; phenol derivatives; phosphonium compounds and fluorinated phosphonium compounds; calix(n)arenes; cyclodextrins; polyester salts; metal complex compounds; cyclooligosaccharide-boron complexes, interpolyelectrolyte complexes; benzimidazolones; azines, thiazines or oxazines.

10. A powder or powder coating material comprising an acrylic resin or polyester resin containing epoxy, carboxyl or hydroxyl groups, or a combination of such resins, from 0.5 to 20% by weight, of shaded or unshaded mixed-crystal pigment as set forth in claim 1, and from 0.1 to 5% by weight, based in each case on the overall weight of the powder or powder coating material, of a charge control agent from the class of the triphenylmethanes, ammonium and immonium compounds; fluorinated ammonium and immonium compounds; biscationic acid amides; polymeric ammonium compounds; diallylammonium compounds; aryl sulfide derivatives; phenol derivatives; phosphonium compounds and fluorinated phosphonium compounds; calix(n) arenes; cyclodextrins; polyester salts; metal complex compound; cyclooligosaccharide-boron complexes, interpolyelectrolyte complexes; benzimidazolones; azines, thiazines or oxazines.

11. An inkjet comprising from 0.5 to 15% by weight of a mixed-crystal pigment as set fourth in claim 1.

12. A hot-melt inkjet consisting essentilly of from 20 to 90% by weight of wax and from 1 to 10% by weight of a mixed-crystal pigment as set forth in claim 1.

* * * * *